UNITED STATES PATENT OFFICE.

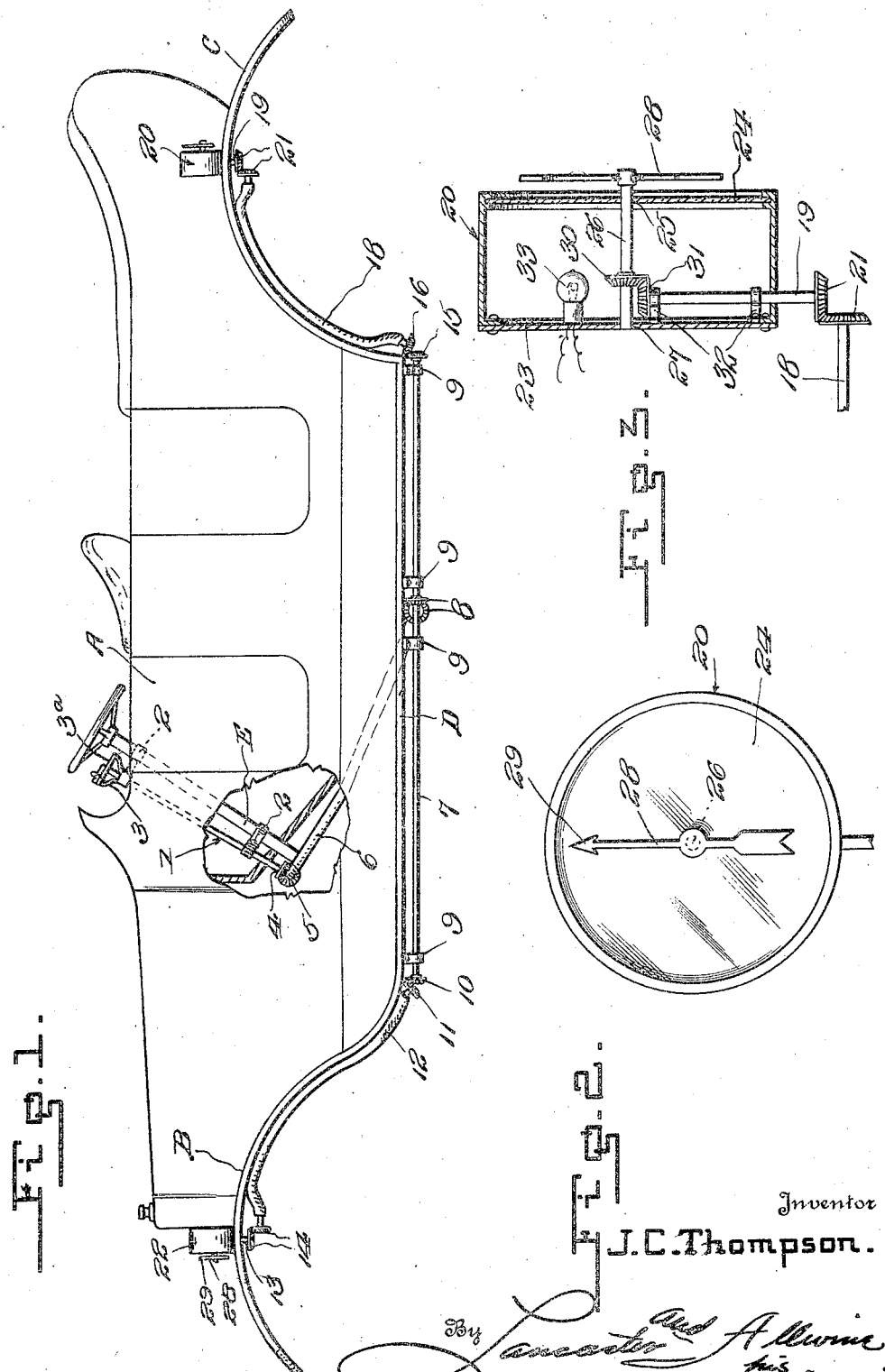

JESSE C. THOMPSON, OF MARION, OHIO, ASSIGNOR OF ONE-HALF TO THOMAS W. THOMPSON, OF MARION, OHIO.

VEHICLE-SIGNAL.

1,316,068.   Specification of Letters Patent.   Patented Sept. 16, 1919.

Application filed May 13, 1918. Serial No. 234,244.

*To all whom it may concern:*

Be it known that I, JESSE C. THOMPSON, a citizen of the United States, and a resident of Marion, in the county of Marion and State of Ohio, have invented certain new and useful Improvements in Vehicle-Signals, of which the following is a specification.

This invention relates to vehicle signals, and the primary object of the invention is to provide a vehicle signal which is extremely simple in construction, comprising an indicating arrow or arm, which is rotatable, through the rotation of a rod carried by the steering post, of an automobile or analogous vehicle, for moving the rod into the direction to be taken by the vehicle and further to provide suitable housings for the operating mechanism of the indicating arm, one housing and companion structure being adapted to be mounted upon the left side of the vehicle upon the mud guard over the rear wheel, and a second housing and arm mounted upon the mud guard over the front wheel of the vehicle at the left-hand side of the vehicle body, and further to provide means embodying flexible shafts for transmitting movement from a rod carried by the steering post of the vehicle to the indicating arm, whereby the arm may be moved to indicate the direction to be taken by the vehicle.

Other objects of the invention will appear in the following detailed description, taken in connection with the accompanying drawing forming a part of this specification, and in which drawing:

Figure 1 is a side elevation of the body of an automobile showing the improved signal applied thereto.

Fig. 2 is a face view of the signal.

Fig. 3 is a section through the housing showing the mechanism for operating the signaling arm.

Referring more particularly to the drawing, A designates the body of an automobile or analogous motor vehicle which has the usual type of front mud guards B and rear mud guards C, connected by the usual type of step D. The vehicle body A also carries the usual steering post E, which controls the operation of the steering wheels of the vehicle.

The vehicle signal, which is illustrated in Fig. 1 is attached to the vehicle body A, comprises a rod 1, which is rotatably supported by suitable supporting brackets 2 carried by the steering post E. The rod 1 has a handle 3 formed upon the upper end of the same to facilitate the rotary movement thereof. A circular protector or support 3ᵃ is attached to the steering post E and engages beneath the handle 3. A beveled pinion 4 is carried by the lower end of the rod 1 and meshes with a second beveled pinion 5 mounted upon a flexible shaft 6. The flexible shaft 6 is connected to a shaft 7 which extends longitudinally beneath the step D of the vehicle body A, by minor gears 8. The shaft 7 is rotatably supported by suitable bearings 9 suspended from the under surface of the step D. The forward end of the shaft 7 has a beveled gear 10 mounted thereupon which meshes with the beveled gear 11 carried by a flexible shaft 12. The flexible shaft 12 is in turn operatively connected to a vertical shaft 13 of the forward or front signal mechanism by minor gears 14. A beveled gear 15 is mounted upon the rear end of the shaft 7 and it meshes with a beveled gear 16 carried by a flexible shaft structure 18. The flexible shaft structure 18 is connected to the vertical shaft 19 of the rear signal structure 20 by minor gears 21. The front and rear signal structures 22 and 20 respectively, include housings 23. The rear side of the housing 23 of the rear signal 20 is preferably formed of red glass or analogous transparent material 24, which glass plate is provided with a central opening 25. A shaft 26 is journaled in the opening 25 and in a second opening 27 formed in the rear side of the housing 23. The horizontal shaft 26 has an indicating arm 28 mounted upon its outer end, which arm is preferably made in the shape of an arrow, the head 29 thereof being adapted to point in the direction to be taken by the vehicle. The shaft 26 has a beveled gear 30 mounted thereon which meshes with a beveled gear 31 carried by the vertical shaft 19. The shaft 19 is rotatably supported by suitable bearing members 32 which are supported within the housing 23. The housing 23 of the rear signal structure 20, may have an incandescent light bulb 33 mounted therein, so that the signal may be used in lieu of the ordinary tail light now commonly employed upon motor vehicles. If the panel or plate 24 is of red transparent material, the glass of the incandescent bulb 33 may be white, or if it is desired to have the panel 24 of white translucent material, the light bulb 33 should then be red, as required by various State laws.

The front signal mechanism 22, is identical with the rear signal mechanism 20, in all respects, and has a light bulb placed within the housing to render the signal visible at night.

The gears and shafts which are positioned beneath the mud guards and step of the vehicle may be inclosed in suitable casings to protect them without departing from the spirit of this invention.

It is to be understood that the signal may be used for indicating various intentions of the driver of the vehicle, for instance; the arrow or indicating arm 28 may be moved into a predetermined position to indicate that the operator is going to stop the vehicle, in other predetermined positions to indicate that the driver is going to slow down the vehicle, start it, or back it.

Having thus fully described the invention, what is claimed is:

1. The combination with a motor vehicle including a steering post, mud guards, and a step, of signaling means supported upon said mud guards at one side of the vehicle and at the front and rear ends thereof, a shaft rotatably supported by and beneath said step, means connecting said steering post and shaft, and flexible shafts carried by and beneath said mud guards and operatively connecting said signaling mechanism and said shaft.

2. The combination with a motor vehicle including a steering post, mud guards, and a step, of a signaling mechanism supported upon the front and rear mud guards at one side of the vehicle, operating shafts for said signaling mechanisms extending downwardly through the mud guards, a shaft rotatably supported beneath said step, means operatively connecting said steering post and shaft, and flexible shafts carried by and beneath said mud guards and operatively connecting the operating shafts of said signaling mechanism to said step carried shafts, said flexible shafts being bent to conform to the configuration of the under surface of the mud guards.

3. The combination with a motor vehicle including a steering post, mud guards and a step, of a signaling mechanism carried by the front and rear mud guards at one side of the vehicle, operating shafts for said signaling mechanism projecting downwardly through said mud guards, a shaft rotatably supported by and beneath said step, a rod rotatably carried by said steering post, a flexible shaft operatively connecting said rod and said step carried shaft, flexible shafts carried by said mud guard and shaped to conform to the configuration of the under surfaces of the mud guards, and means operatively connecting said flexible shafts to said step carried shaft and means operatively connecting said flexible shafts to the operating shafts of said signaling mechanism.

JESSE C. THOMPSON.